(12) United States Patent
Liu (10) Patent No.: US 8,779,711 B2
(45) Date of Patent: Jul. 15, 2014

(54) INDUCTION MOTOR DRIVER

(75) Inventor: Yang Liu, Fremont, CA (US)

(73) Assignee: Princeton Power Systems, Inc., Lawrenceville, NJ (US)

( * ) Notice: Subject to any disclaimer, the term of this patent is extended or adjusted under 35 U.S.C. 154(b) by 288 days.

(21) Appl. No.: 13/090,426

(22) Filed: Apr. 20, 2011

(65) Prior Publication Data

US 2012/0268056 A1 Oct. 25, 2012

(51) Int. Cl.
*H02P 7/00* (2006.01)

(52) U.S. Cl.
USPC .......................................... 318/432; 318/434

(58) Field of Classification Search
USPC ......... 318/727, 609, 610, 461, 798, 432, 434, 318/799
See application file for complete search history.

(56) References Cited

U.S. PATENT DOCUMENTS

| | | | |
|---|---|---|---|
| 4,523,269 A | 6/1985 | Baker et al. | |
| 4,926,104 A * | 5/1990 | King et al. | ................... 318/599 |
| 4,959,766 A | 9/1990 | Jain | |
| 5,119,285 A | 6/1992 | Liu et al. | |
| 5,121,314 A | 6/1992 | Cathell et al. | |
| 5,224,029 A | 6/1993 | Newman, Jr. | |
| 5,267,138 A | 11/1993 | Shores | |
| 5,329,221 A | 7/1994 | Schauder | |
| 5,345,375 A | 9/1994 | Mohan | |
| 6,118,678 A | 9/2000 | Limpaecher et al. | |
| 6,462,492 B1 * | 10/2002 | Sakamoto et al. | ....... 318/400.32 |
| 6,765,452 B2 | 7/2004 | Yuan et al. | |
| 7,064,514 B2 * | 6/2006 | Iwaji et al. | ..................... 318/801 |
| 7,333,331 B2 | 2/2008 | Yamabuchi et al. | |
| 7,643,317 B2 | 1/2010 | Katoh et al. | |
| 7,659,700 B2 | 2/2010 | Holveck et al. | |
| 2006/0250765 A1 | 11/2006 | Yamabuchi et al. | |
| 2010/0128502 A1 * | 5/2010 | Kawamoto et al. | ............. 363/34 |

OTHER PUBLICATIONS

"Related U.S. Appl. No. 13/238,688 Office Action", Sep. 12, 2013, Publisher: USPTO, Published in: US.

* cited by examiner

*Primary Examiner* — Rina Duda
(74) *Attorney, Agent, or Firm* — Kaplan Breyer Schwarz & Ottesen, LLP (57) ABSTRACT

A switched resonant power converter applies AC to an induction motor. The power converter controls the magnitude and phase of the motor current, and tuning the stator flux accordingly in order to control the motor speed. A preprocessor operates on a speed command signal by getting the user speed command input to produce amplitude and phase-related signals for application to inputs of the power converter control.

7 Claims, 6 Drawing Sheets

INDUCTION MOTOR DRIVER

BACKGROUND

Induction alternating-current (AC) motors are advantageous by comparison with direct-current or synchronous motors in that they do not require commutators, contact brushes or slip rings to provide energization to the rotor. The induction motor thus lacks a wear part, and so can be more reliable. The advent of solid-state motor controls has made the AC motor practicable for direct torque control and variable speed servo applications. AC-Link AC-to-AC converter or load controller act as pure current source power supplies, providing superior fast response for current control than does a voltage source.

Figure 1:
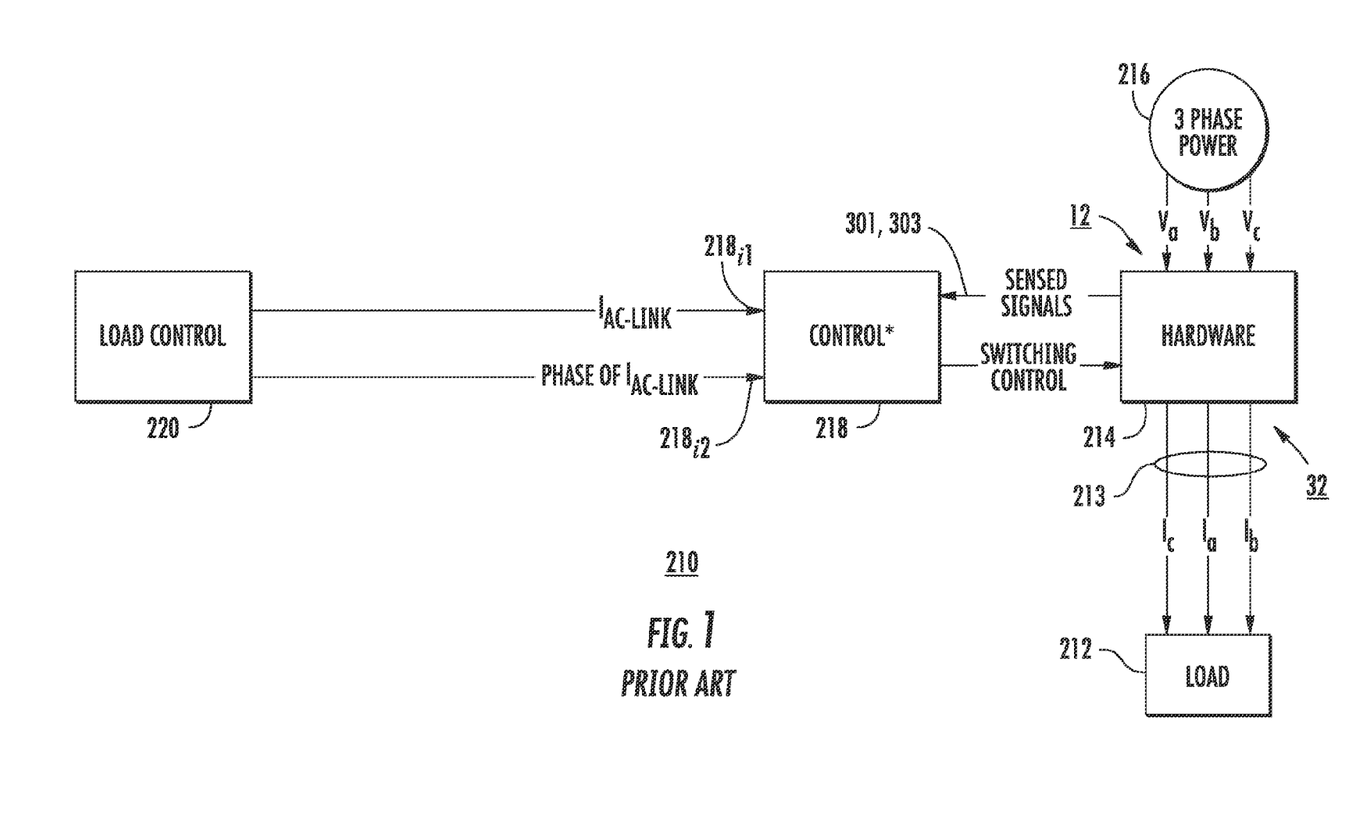
FIG. 1 is a simplified block diagram of a prior-art power controller including a load, hardware portions, and control portions, and with a user command function.
Figure 2:
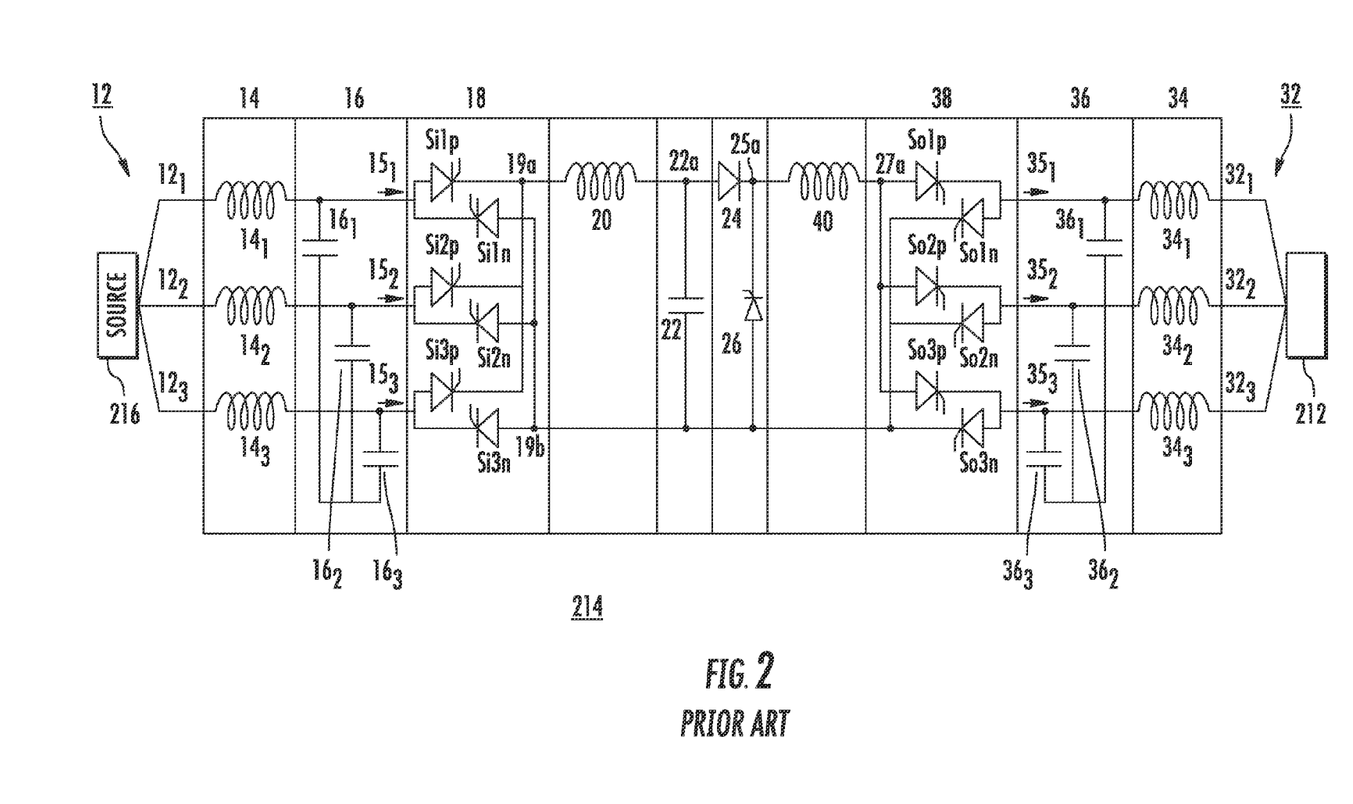
FIG. 2 is a simplified diagram in block and schematic form illustrating one possible prior-art hardware switching apparatus for use in the arrangement of FIG. 1.

FIG. 1 is a simplified block diagram illustrating a prior-art load, hardware and controller designated together as 210. In FIG. 1, the load 212 of receives three-phase alternating current by way of a path 213 from a switched hardware arrangement illustrated as a block 214. The three phases of load current appearing at hardware output ports 32 are designated $I_a$, $I_b$, and $I_c$. Switched hardware arrangement 214 receives 3-phase alternating voltage Va, Vb, and Vc at input ports 12 from the power mains, illustrated as 216. Hardware block 214 may include switching elements such as those illustrated in FIG. 2. The hardware circuit of FIG. 2 is described in U.S. Pat. No. 7,659,700, issued Feb. 9, 2010 in the name of Holvek et al. and the type of circuit is described more generally in U.S. Pat. No. 6,118,678, issued Sep. 12, 2000 in the name of Limpaecher et al.

In the prior-art arrangement of FIG. 1, switching control circuit 218 receives command signals from a command control block 220, and translates the command signals into switching control signals for the various switches of FIG. 2. Switching control circuit 218 also receives information ("sensed signals") relating to the operating parameters of hardware block 214 by way of a set of paths designated 301, 303. As described by Holvek et al., hardware apparatus 10 includes a three-phase "input" terminal 12 defining three input terminals $12_1$, $12_2$, and $12_3$. An input filter inductor section 14 including inductors $14_1$, $14_2$, and $14_3$ is connected between input terminal 12 and an input filter capacitor section 16. Filter capacitor section 16 includes input filter capacitors $16_1$, $16_2$, and $16_3$. A switching section 18 of controllable input controllable unidirectional current conductive devices (switches) is coupled to filter capacitor section 16, and includes switches Si1p, Si1n, Si2p, Si2n, Si3p, and Si3n. Among the switches of section 18, Si1p, Si2p, and Si3p conduct current in a first direction, and have their cathodes connected together at a first node 19a. Controllable switches Si1n, Si2n, and Si3n conduct current in a second or opposite direction, and have their anodes connected to a second node 19b. A "central" capacitor 22 is connected between nodes 19b and 22a. A charging inductor 20 is connected between node 19a and node 22a. A "freewheeling" unidirectional current conducting device in the form of a diode or rectifier 24 has its anode connected to node 22a and its cathode connected to a node 25a. A freewheeling controllable switch 26 has its anode connected to node 19b and its cathode connected to node 25a. A discharge inductor 40 is connected between nodes 25a and 27a. An output switch set 38 includes controllable switches So1p, So2p, So3p, So1n, So2n, and So3n. Output switch set 38 connects nodes 19b and 27a to a set 36 of output filter capacitors $36_1$, $36_2$, and $36_3$, and through a set 34 of output filter inductors $34_1$, $34_2$, and $34_3$ to a three-phase load 212 connected to terminals $32_1$, $32_2$, and $33_3$.

Figure 3:
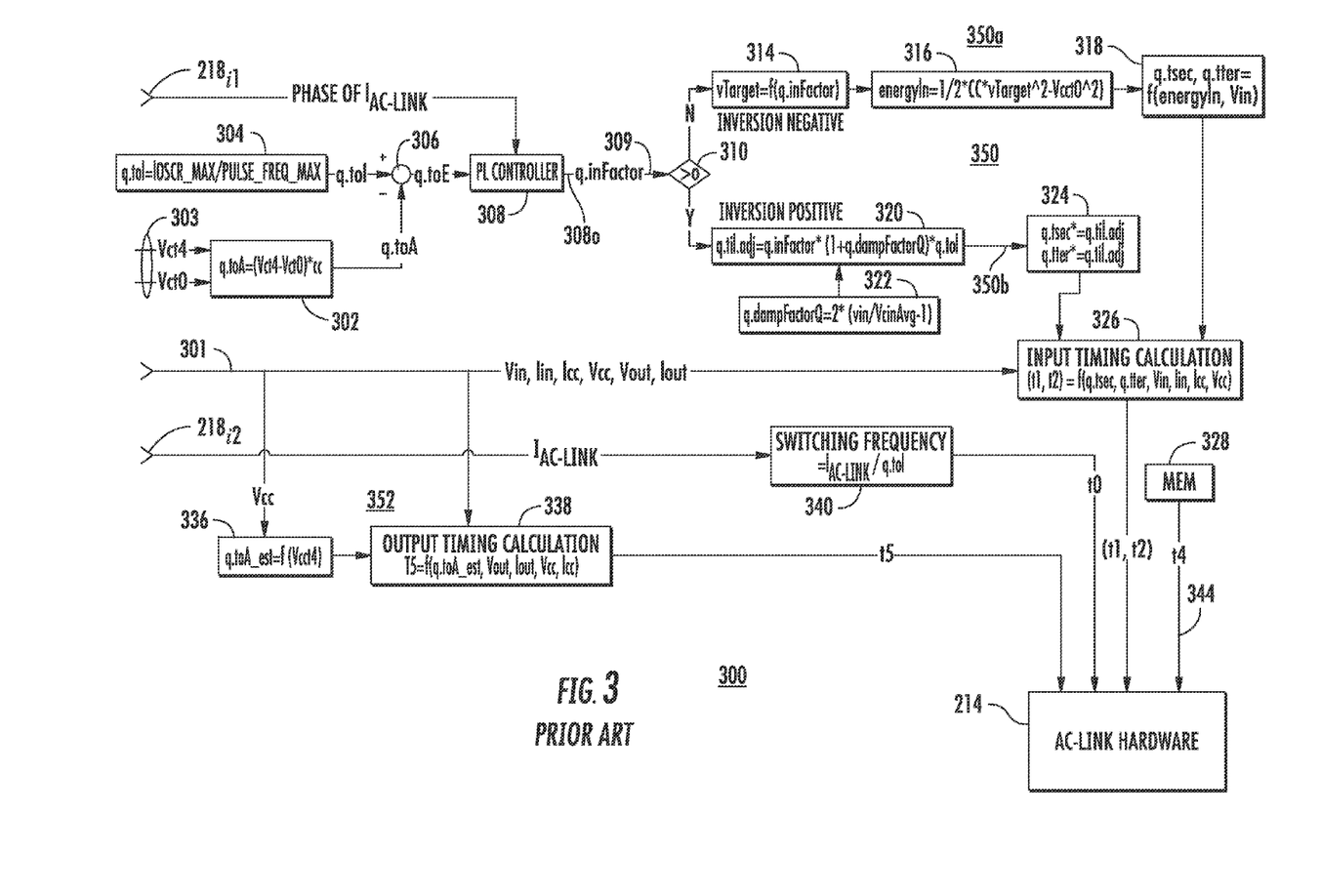
FIG. 3 is a simplified functional block diagram of a prior-art hardware controller which may be used in the arrangement of FIG. 1 to control the hardware for driving a load.

FIG. 3 is a simplified functional block diagram illustrating a prior-art controller 300 for, in "normal" or not-power-limited operating mode, generating the switching control signals for the input and output switch sets 18 and 38 of FIG. 2. All the functions 300 illustrated in FIG. 3 may be performed in a digital processor or a plurality of conjoined digital processors. In FIG. 3, elements corresponding to those of FIGS. 1 and 2 are designated by like alphanumerics. In the prior art arrangement of FIG. 3, controller 300 receives digital signals at an input port $218_{i1}$ representing the commanded phase of the IAC-Link (load) current ($I_{AC-Link}$), and also receives digital signals at input port $218_{i2}$ representing the commanded magnitude of the $I_{AC-Link}$ current. The $I_{AC-Link}$ current is the instantaneous three-phase input current to load 212 of FIG. 1. Controller 300 of FIG. 3 also receives digital signals Vin, Iin, Icc, Vcc, Vout, and Iout on a bus 301. Vin represents the instantaneous input voltage applied from 3-phase source 216 to hardware 2140f FIG. 1, Iin represents the instantaneous current applied from 3-phase source 216 to hardware 214, Icc represents the instantaneous current flow through the central capacitor 22 of FIG. 2. Vout and Iout also appear on bus 301, and represent the instantaneous output voltage and current of hardware 214 of FIG. 2. In addition, a processing block 302 receives by way of path 303 signals Vct0 and Vct4, which are sensed central capacitor 22 voltage at switching times t0 and t4, respectively. Times t0 and t4 are related to various switching times of the switches of hardware 214. Processing block 302 performs the calculations $$q.toA=(Vct4-Vct0)*CC$$

where:
A represents an actual (measured) value;
O represents an output value;
t represents a total value;
q represents charge on the central capacitor;
* represents multiplication; and
CC represents the capacitance of central capacitor 22 of FIG. 2.

The q.toA output of block 302 represents the actual output or total discharge on the central capacitor and on the entire hardware. It also represents how much charge should be or has been applied to the motor during the switching event.

In FIG. 3, a source 304 of digital signals generates [signal $$q.toI=IOSCR\_MAX/PULSE\_FREQ\_MAX$$

where:
IOSCR_MAX is the maximum current that the hardware can carry, and is stored in memory; and
PULSE_FREQ_MAX is maximum switching frequency of the hardware, also stored in memory.

Signal q.toI produced by block 304 represent ideal output total capacitor discharge to be applied or transferred to load 212 during the current (contemporaneous) switching event. Signals q.toI are applied from block 304 to a noninverting (+) input port of an error detector or differencing circuit 306. Processing block 302 applies signal $$q.toa=(Vct4-Vct0)*CC$$

to the inverting (−) input port of error detector 306, where:
Vcct0 is voltage across central capacitor 22 at time t0;
Vcct4 is voltage across central capacitor 22 at time t4. Signal q.toa represents the actual total discharge transferred from the central capacitor during the current switching event. Error detector 306 produces a signal q.toE representing the difference between the actual and ideal capacitor discharge transferred during the current switching event. The q.toE error signal is applied from the output port of error detector 306 to a proportional-integral (PI) controller block 308. The processing in block 308 is given by $$q.\text{inFactor} = Kp * e(t) + Ki * \text{integral}(e(t)dt)$$

where:
Kp is the proportional gain; and
Ki is the integral gain, both of which are preset.

The q.inFactor signal produced by PI controller 308 of FIG. 3 is applied from an output port 308o by way of a bus 309 to timing calculations for the switches of the hardware 10 of FIG. 2. More particularly, the output signal from output port 308O of block 308 is applied by way of bus 309 to blocks designated generally as 350 for calculation of the timing for the input switches 18 of hardware 10 of FIG. 2. Input switch timing calculations 350 of FIG. 3 include blocks 310, 314, 316, 318, 320, 322, 324, and 326. Decision block 310 of FIG. 3 examines the q.inFactor signal, and determines if the q.inFactor signal is less than zero (<0). If the q.inFactor signal is greater than zero, the logic leaves decision block 310 by the NO (N) output, and arrives at a block 314 of a branch 350a of the input switch timing calculation group 350. Block 314 calculates "inversion negative" target voltage of the central capacitor 22 vTarget as being equal to a function of q.inFactor.

$$v\text{Target} = Vct0 + 2[Vin - Vct0]$$

The input energy EnergyIn of central capacitor 22 is calculated in block 316 as $$\text{EnergyIn} = \tfrac{1}{2} * CC * (v\text{Target}^2 * Vcct0^2)$$

where:
Vcct0 is voltage across central capacitor 22 at time t0.

From block 316, the logic of FIG. 3 flows to a block 318. Block 318 represents calculation, using a function of Vin and energyin, of q.tsed and q.tter, which are the charge that should be transferred for the first switching event and the charge that should be transferred for the second switching event, respectively. The q.tsec and q.tter signals from block 318 are made available to an input timing calculation block 326.

As mentioned, decision block 310 of FIG. 3 examines the q.inFactor signal, and determines if the q.inFactor signal is less than zero (<0). If the q.inFactor signal is less than zero, the logic leaves decision block 310 by the YES (Y) output, and arrives at an inversion positive block 320 of a branch 350b of the input switch timing calculation group 350. Block 320 receives a damping factor q.dampFactorQ from a block 322. Block 322 calculates the damping factor as $$q.\text{dampFactorQ} = 2 * \left( \frac{Vin}{VcinAvg - 1} \right)$$

where:
Vin is the instantaneous value of voltage at port 12 of the hardware of FIG. 2; and
VCinAvg is the average of the input voltage at port 12 of the hardware 10 of FIG. 2.

The qdampFactorQ signal is applied from block 322 to block 320.

Block 320 receives the qdampFactorQ signal and calculates a signal q.tiI.adj $$q.til.\text{adj} = q.\text{inFactor} * (1 + q.\text{dampFactorQ}) * q.tol$$

representing the adjustment for the charge need to be transferred for next switching event from last switching event, and applies the signal to a block 324. Block 324 calculates q.tsec* and q.tter*.

$$q.tsec = (q.tll.\text{adj}) * q.tsec$$

$$q.tter = (q.tll.\text{adj}) * q.tter$$

where:
q.tsec* is the charge that should be transferred from the central capacitor for the first switching event;
q.tiI.adj is an adjustment to the charge that should ideally be transferred from the central capacitor for the next switching event from the last or previous switching event;
q.tter* is the charge that should be transferred from the central capacitor for the second switching event. The values of q.tsec* and q.tter* are applied from block 324 to block 326. Thus, the q.tsec and q.tter are ultimately applied to input switch timing calculation block 326 regardless of the decision as to the magnitude of the q.inFactor by decision block 310.

Block 326 of FIG. 3 receives the inversion positive signals q.tsec* and q.tter* from block 324 or the inversion negative signals q.tsec and q.tter from block 318, depending upon the state of decision block 310. Block 326 also receives Vin, Iin, ICC, VCC, Vout, and Iout information from bus 301, where ICC and VCC represent instantaneous measurements of the current and voltage of central capacitor 22, respectively. Block 326 performs various calculations to determine the timing t1 and t2 of the input switches of set 18 of FIG. 2. The timing t1 is calculated with the equations $$V_1 = Vct0 - Vin$$

$$q.t\sec = \int_{t0}^{t1} cc * dV1$$

where:
V1 is the equivalent voltage applied during the interval t0 to t1 to charging inductor 20 of FIG. 2.

The timing t2 is calculated with the equations $$Vct1 = \frac{q.t\sec}{cc}$$

$$V2 = Vct1 - Vin$$

$$q.tter = \int_{t1}^{t2} cc * dV2$$

where:
V2 is the equivalent voltage applied during the interval t1 to t2 to charging inductor 20 of FIG. 2. The timing information t1 and t2 is applied to the hardware 214 for controlling the input switches 18.

A memory 328 stores information about time parameter t4, and provides the parameter to hardware block 214 by way of a path 344.

The timing for the output switches 38 of the hardware 10 of FIG. 2 is generated by portion 352 of the controller arrangement 300 of FIG. 3. Portion 352 of controller arrangement 300 includes blocks 336 and 338.

Block 336 of FIG. 3 receives VCC signal from bus 301, representing an estimate of the total discharge of the central capacitor 22 at the last (previous) switching event. Block 336 processes to produce a q.t0A_est signal $$q.toa\_\text{est} = q.toI - (|Vct0| - |Vct4|) * cc,$$

which is a function of signal Vct4, the central capacitor voltage at time t4. The q.t0A signal is applied to a block 338. Block 338 performs output timing calculation to determine or establish time t5

$$V5 = Vcc - Vout$$

$$q.toa\_est = \int_{t4}^{t5} cc - dV5$$

where:
V5 is the equivalent voltage applied to the central or discharging inductor (40 of FIG. 2).
The calculated value of time t5 is applied to hardware 214.
A further block 340 of FIG. 3 receives $I_{AC-Link}$ from input port 218i2, and calculates the switching timing t0, which is dependent upon the switching frequency.

$$t0 = IAC\text{-}LINK/q.toi$$

where q.toi is produced by block 304. The calculated switching frequency t0 is applied from block 340 to hardware 214.

SUMMARY OF THE INVENTION

A method is for controlling the speed of an induction motor including a rotor. The method comprises the steps of selecting a desired rotor speed, and determining motor rotor speed. The motor rotor speed is compared to the desired rotor speed, to thereby generate a speed error signal. The speed error signal is applied to a proportional-integral controller, to thereby generate a torque command signal. The torque command signal is normalized to the maximum specified motor torque to thereby generate normalized signals. The magnetizing current of the motor is determined. A stator current amplitude command signal (IAC-Link) is generated from the torque command signal. The stator current amplitude command signal may be generated by iteratively calculating $$I_{AC-Link} = \sqrt{\text{torque current}^2 + \text{magnetizing current}^2}$$

The ideal volts/Hz for the motor is determined. The actual volts/Hz is subtracted from the ideal value of volts/Hz to thereby generate volts/Hz error. The volts/Hz error is multiplied by at least a constant and an integral to thereby generate a phase correction signal. A current phase precursor signal is generated from the torque command signal. The current phase precursor signal may be generated by iteratively calculating $$\text{current phase precursor} = \arctan\left(\frac{\text{magnetizing current}}{\text{torque current}}\right)$$

The current phase precursor signal is added to the phase correction signal to thereby generate a signal representing the phase of the stator current. The switching of current to and from a central capacitor is controlled in response to the amplitude command signal and the signal representing the phase of the stator current. In a particular mode of the method, the step of determining motor rotor speed further comprises the step of measuring rotor speed with a tachometer mechanically coupled to the rotor.

A control apparatus for an induction motor, which motor includes a stator, comprises a source of three-phase alternating current and a switching circuit. The switching circuit includes a source port coupled to the source of alternating current and a motor port coupled to the stator. The switching circuit includes a central capacitor through which all charge flows between the source port and the motor port and also includes controllable switches for routing the charge to create stator current. A switching controller is coupled to the controllable switches for establishing the timing of the controllable switches in response to digital command signals representing (a) the amplitude of the stator current and (b) the phase of the stator current. The control apparatus also includes a source of motor speed command signals, and a motor control arrangement coupled to the source of motor speed command signals and to the switching controller. The motor control arrangement comprises
an error detector for generating a motor speed error signal, a controller for generating a torque command signal from the speed error signal, and a torque current normalizing arrangement for normalizing the torque command signal to the full-load motor torque to produce torque current signal. The motor control arrangement also include a processor for processing the torque current signal for generating signals representing (a) the amplitude of the stator current and (b) the phase of the stator current, both adjusted by the magnetizing current of the motor.

The motor control arrangement further comprises
a coupling path for coupling the signals representing the amplitude of the stator current adjusted by the magnetizing current from the motor control arrangement to the switching controller for control of the timing of the switches. The motor control arrangement also comprises an error detector coupled to the motor port and to a source of nominal motor V/Hz signal, for generating V/Hz error signal. The motor control arrangement also comprises a summing circuit coupled or arranged to sum processed V/Hz error signal with the signals representing the phase of the stator current, to thereby generate phase-corrected signals representing the phase of the stator current, and a coupling path for coupling the phase-corrected signals representing the phase of the stator current to the switching controller.

DESCRIPTION OF THE INVENTION

Use of a current control power supply for driving induction motors provides for advantageous AC motor vector control, with dynamic response better than that provided by traditional voltage source controllers. When it is desired to use the hardware 214 of FIG. 2 with the controller 300 of FIG. 3 to drive the stator 412s of an induction motor such as 412 of FIG. 4, one might be motivated to connect the stator of the induction motor to the hardware as though it were a resistive load, and to apply control signals to terminals 218i1 and 218i2 representing the phase and amplitude, respectively, of $IA_{C\text{-}Link}$ current applied from the hardware 214 to the motor load. However, a motor is not a simple resistive load, but is dynamic, and its characteristics depend upon the magnitude and sign of the mechanical load, and on the applied voltage. In general, what is desired is to control the motor speed regardless of the magnitude or sign of the mechanical load. In particular, the mechanical load may be viewed as having inertia which causes delay in spinning up to the desired or commanded speed, and which, when spinning, resists commanded speed decrease by "flywheel" effect. Improved or alternative induction motor drive arrangements are desired.

Figure 4:
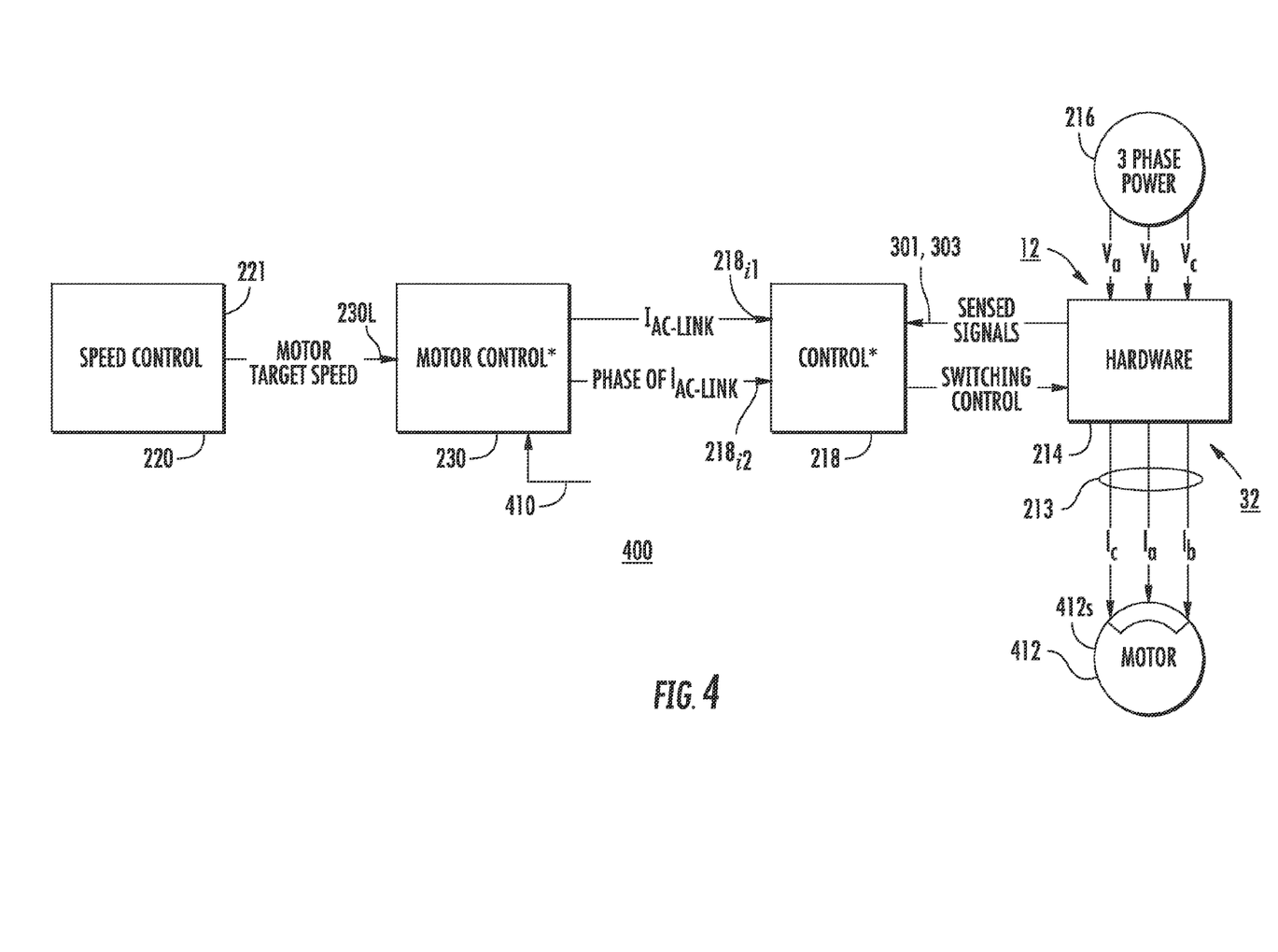
FIG. 4 illustrates an arrangement similar to that of FIG. 1, including a further motor control block or function and its relationship to the arrangement of FIG. 1.

FIG. 4 is a simplified block diagram of a system 400 according to aspects of the disclosure. Elements of FIG. 4 corresponding to those of FIG. 1 are designated by like reference alphanumerics. The load 212 of FIG. 1 is replaced by the rotor 412S of an induction motor 412. In FIG. 4, a block 220 represents user controls, which may be as simple as a speed selector, either digital or analog. If analog, the user command block 220 may include an analog-to-digital converter (ADC). The speed command signal is applied from speed control block 220 by way of a path 221 to an input port 230i of motor controller 230. Motor current controller 230 receives motor stator voltage signals by way of a path 410, and produces processed current amplitude (I) and corresponding current phase angle (θ) signals. The current amplitude- and phase-signals $I_{AC\text{-}Link}$ and $\theta_{AC\text{-}Link}$, respectively, are applied to input ports 218i1 and 218i2, respectively, of control block 218 to effect the desired motor speed control.

Figure 5A:
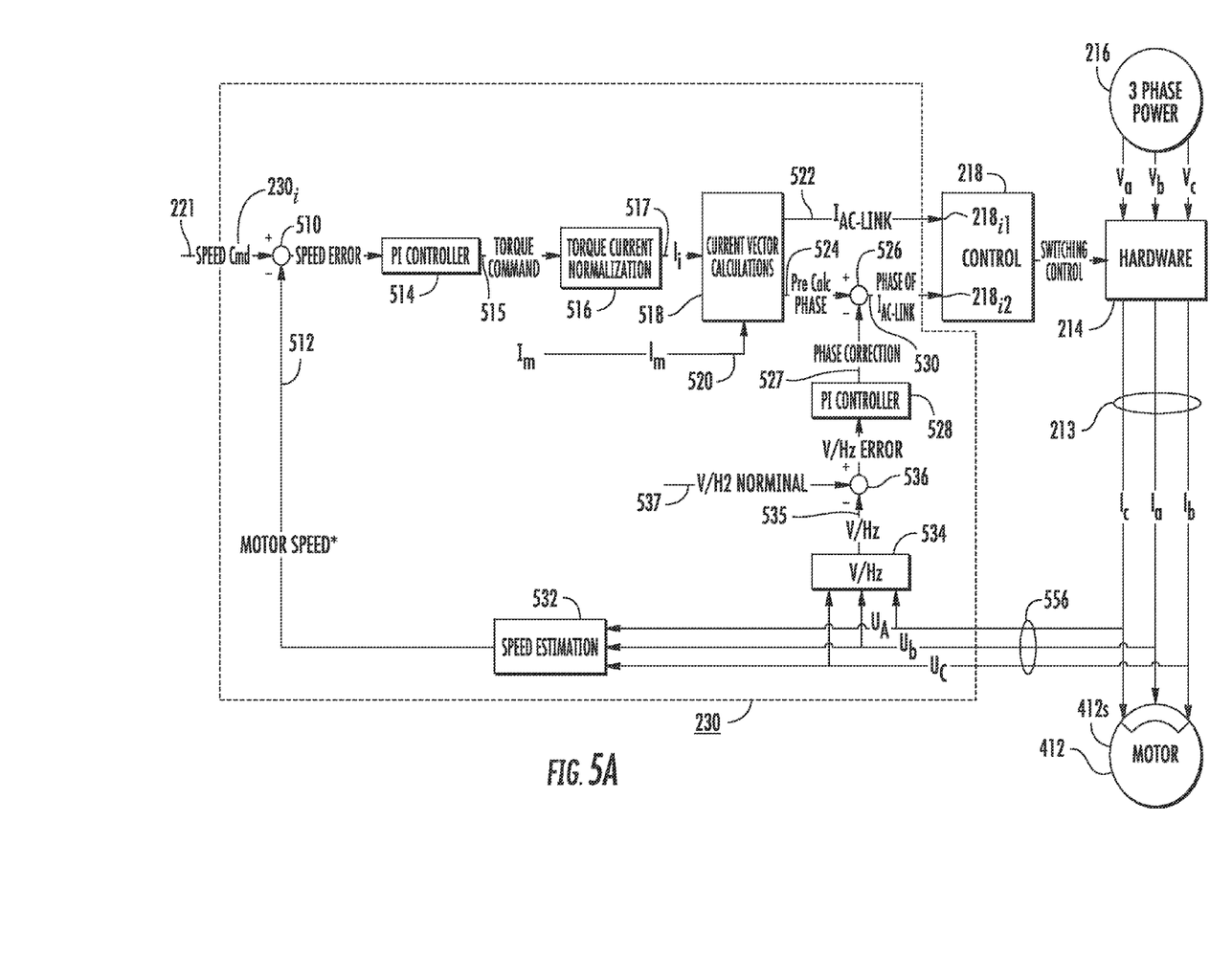
FIG. 5A is a simplified diagram in block and schematic form illustrating details of the motor control block of FIG. 4.

FIG. 5A is a simplified functional block diagram illustrating details of motor current controller 230 of FIG. 4 and its relationship to hardware 214, controller 218, and motor 412. In FIG. 5A, elements corresponding to those of FIG. 4 are designated by like reference numerals. The user-commanded speed is applied by way of path 221 and input port 230i to the noninverting (+) input port of an error detector 510. A motor rotor speed signal motorspeed* is applied by way of a path 512 to an inverting (−) input port of an error detector 510, and the difference or speed error signal produced by error detector 510 is applied to a Proportional-Integral filter illustrated as a block 514 to produce a motor torque command signal on a path 515. The resulting motor torque command signal is applied to a block 516, which represents torque current normalization, to thereby produce a torque current signal $I_t$ on a path 517. Torque current normalization is accomplished pursuant to $$\text{torque current} = \frac{\text{torque command} * \text{full load torque current}}{\text{full load torque}}$$

where:
* represents ordinary multiplication.
The full load torque and full load torque current of the motor are known or calculated from the specifications or motor characteristics, and can be provided to block 516 by a memory (not illustrated) preloaded with the relevant values. The torque current signal $I_t$ from current normalization block 516 is applied by way of a path 517 to a current vector calculating or magnetizing current adjustment block 518. Magnetizing current adjustment block 518 also receives from a memory (not illustrated) a magnetizing current signal Im by way of a path 520. Magnetizing current signal Im represents the magnetizing current required by the particular motor 412 which is to be controlled, and is known from the motor specifications.

Magnetizing current adjustment block 518 of FIG. 5A adjusts the control signals depending upon the magnetizing current. There will be a single value of magnetizing current for each different type of induction motor to be controlled. Magnetizing current adjustment block 518 produces the magnitude $I_{AC\text{-}Link}$ of stator current for application by way of a path 522 to port 218i1 of control block 218 by use of the equation $$I_{AC\text{-}Link} = \sqrt{\text{torque current}^2 + \text{magnetizing current}^2},$$

and
produces on a path 524 a current phase precursor by use of the equation $$\text{current phase precursor} = \arctan\left(\frac{\text{magnetizing current}}{\text{torque current}}\right)$$

From magnetizing current adjustment block 518, the $I_{AC\text{-}Link}$ current signal flows by way of path 522 to input port 218i1 of hardware control block 218. The current phase precursor signal is applied from output path 524 of magnetizing current adjustment block 518 to a noninverting (+) input port of a summing or phase correction circuit 526. A phase correction signal is applied over a path 527 to a further noninverting (+) input port of summing or phase correction block 526. The current phase precursor signal from magnetizing current adjustment block 518 is summed in block 526 with a phase correction signal applied over a path 527 from a phase correction signal block 528. Phase correction signal block 528 is a proportional-integral (PI) filter. The corrected current phase precursor signal, which is the phase of $I_{AC\text{-}Link}$, is applied from an output port of phase correction signal block 526 by way of a path 530 to input port 218i2 of hardware control block 218. Control block 218 produces switching control signals for the various switches of the hardware of block 214, as described above. The hardware 214 produces three-phase alternating (AC) stator winding drive currents on path 213. The voltages of the stator drive currents appearing on paths 213 are sampled by paths 566 and are applied to rotor speed estimator block 532 for producing on path 212 a digital signal representing the estimated rotor speed of motor 412. The estimation or measurement of motor speed is well known in the art. The voltages on paths 566 are also applied to a voltage/frequency (V/Hz) block 534. Block 534 knows the frequency from the cyclic variation of the stator drive voltages, and produces a digital signal representing the voltage magnitude of the stator drive divided by the frequency (V/Hz). The V/Hz signal is a constant when the induction motor is in stable or normal operation. The V/Hz signal produced by block 534 is applied to an inverting (−) input port of a differencing or subtracting circuit 536. Subtracting circuit 536 receives at its noninverting (+) input port by way of a path 537 the nominal V/Hz from a memory (not illustrated). The nominal V/Hz is previously determined, and is dependent upon the parameters of the particular induction motor 412. The nominal V/Hz is determined from motor nameplate specifications by $$V/Hz_{NOMINAL} = \frac{\text{nameplate voltage}}{(\sqrt{3}) * \text{nameplate speed (Hz)}}$$

Subtracting circuit 536 subtracts the current error signal V/Hz from the previously determined nominal V/Hz to produce a V/Hz error signal. The V/Hz error signal is applied from subtracting block or function 538 of FIG. 4 to a proportional-integral function 528, for generating the phase correction signal for application to summing function 526.

Figure 5B:
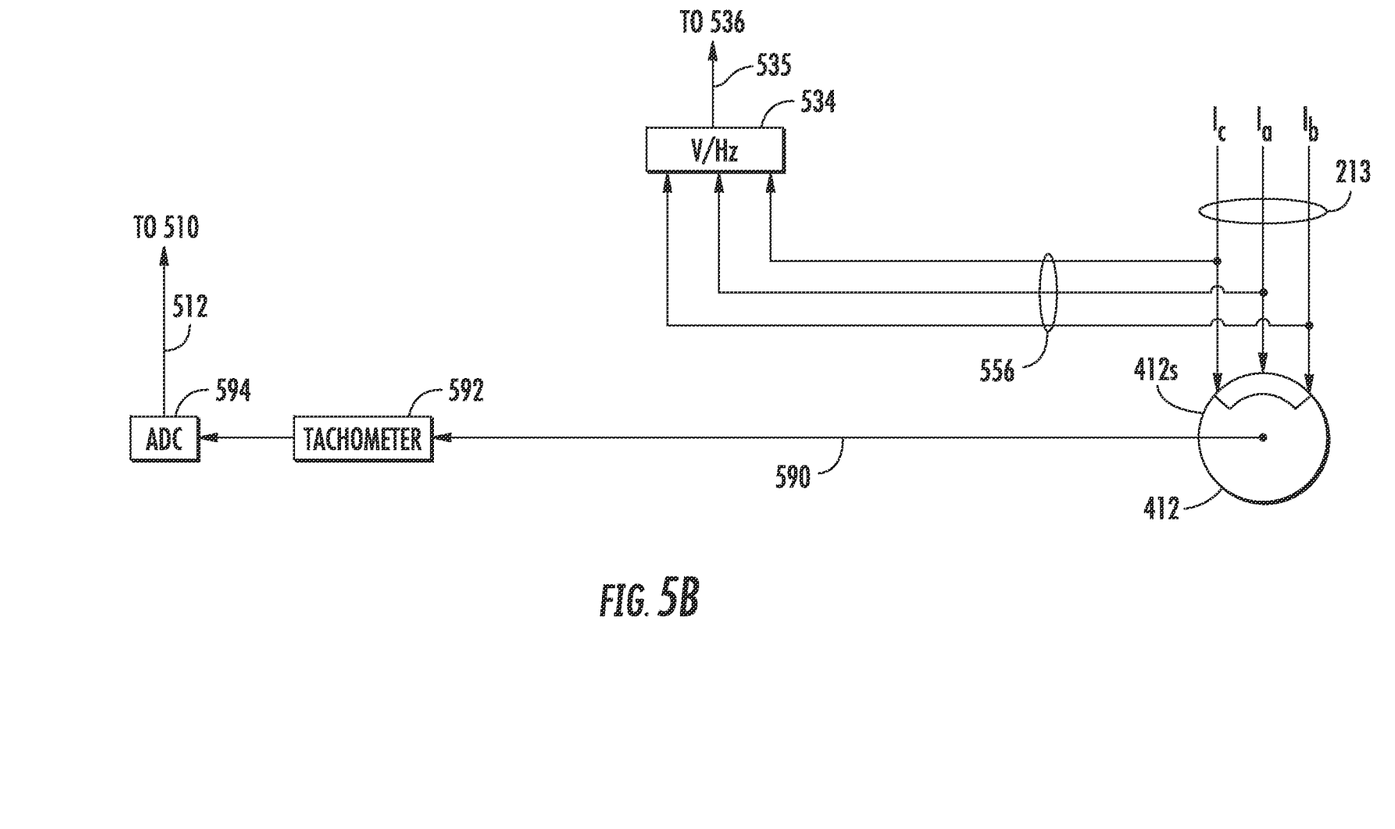
FIG. 5B illustrates a portion of FIG. 5A in an alternative arrangement.

FIG. 5B illustrates an alternative to the arrangement of FIG. 5A. Elements of FIG. 5B corresponding to those of FIG. 5A are designated by like reference alphanumerics. In FIG. 5B, the motor speed signal is generated by a tachometer 592 mechanically coupled to the rotor of the motor 412 by a shaft 590. The signal produced by tachometer 592 may be analog, in which case an analog-to-digital converter (ADC) converts the analog signal to produce a digital speed signal on path 512. This avoids the need for determining the motor speed from the motor voltage in a block 532 of FIG. 5A.

Thus, a switched resonant power converter applies AC to an induction motor. The power converter controls the magnitude and phase of the motor current, and tunes the stator flux in order to control the motor speed. A preprocessor operates on a speed command signal by getting the user speed command input to produce amplitude and phase-related signals for application to inputs of the power converter control.

A method according to an aspect of the disclosure is for controlling the speed of an induction motor (412) including a rotor. The method comprises the steps of selecting a desired rotor speed (221), and determining motor rotor speed (532). The motor rotor speed is compared (510) to the desired rotor speed, to thereby generate a speed error signal. The speed error signal is applied to a proportional-integral controller (514), to thereby generate a torque command signal (515). The torque command signal is normalized to the maximum specified motor torque to thereby generate normalized signals. The magnetizing current of the motor is determined (520). A stator current amplitude command signal (IAC-Link) is generated (518, 522) from the torque command. The stator current amplitude command signal may be generated by iteratively calculating $$I_{AC\text{-}Link} = \sqrt{\text{torque current}^2 + \text{magnetizing current}^2}$$

The ideal volts/Hz for the motor is determined (537). The actual volts/Hz is subtracted (536) from the ideal value of volts/Hz to thereby generate volts/Hz error. The volts/Hz error is multiplied (528) by at least a constant and an integral to thereby generate (on path 527) a phase correction signal. A current phase precursor signal is generated (518, 524) from the torque command. The current phase precursor signal may be generated by iteratively calculating $$\text{current phase precursor} = \arctan\left(\frac{\text{magnetizing current}}{\text{torque current}}\right)$$

The current phase precursor signal (from 518, 524) is added (526) to the phase correction signal (from 528) to thereby generate (on path 530) a signal (phase of $I_{AC\text{-}Link}$) representing the phase of the stator current. The switching of current to and from a central capacitor (22) is controlled in response to the amplitude command signal and the signal representing the phase of the stator current. In a particular mode of the method, the step of determining motor rotor speed further comprises the step of measuring rotor speed with a tachometer mechanically coupled to the rotor.

A controller (400) according to an aspect of the invention is for controlling an induction motor (412) which includes a stator. The controller comprises a source (216) of three-phase alternating current and a switching circuit (214). The switching circuit (214) includes a source port (12) coupled to the source (216) of alternating current and a motor port (32) coupled to the stator (412S). The switching circuit (214) includes a central capacitor (22) through which all charge flows between the source port (12) and the motor port (32) and also includes controllable switches (16, 38) for routing the charge to create stator (412S) current. A switching controller (218) is coupled to the controllable switches (16, 38) for establishing the timing of the controllable switches (16, 38) in response to digital command signals representing (a) the amplitude of the stator current ($I_{AC\text{-}Link}$) and (b) the phase of the stator current (Phase of $I_{AC\text{-}Link}$). The controller (400) also includes a source (220) of motor speed command signals, and a motor control arrangement (230) coupled to the source (220) of motor speed command signals and to the switching controller (218). The motor control arrangement (230) comprises an error detector (510) for generating a motor (412) speed error signal, a controller (514) for generating a torque command signal (515) from the speed error signal, and a torque current normalizing arrangement (516) for normalizing the torque command signal to the full-load motor torque to produce torque current signal ($I_t$). The motor control arrangement (230) also include a processor (518) for processing the torque current signal ($I_t$) for generating signals representing (a) the amplitude of the stator current ($I_{AC\text{-}Link}$) and (b) the phase of the stator current (Phase of $I_{AC\text{-}Link}$), both adjusted by the magnetizing current of the motor (Im).

The motor control arrangement (230) further comprises a coupling path (522) for coupling the signals representing the amplitude of the stator current adjusted by the magnetizing current from the motor control arrangement (230) to the switching controller (218) for control of the timing of the switches. The motor control arrangement (230) also comprises an error detector (536) coupled to the motor port (32) and to a source (537) of nominal motor V/Hz signal, for generating V/Hz error signal. The motor control arrangement (230) also comprises a summing circuit (526) coupled to sum processed (528) V/Hz error signal with the signals representing the phase of the stator current, to thereby generate phase-corrected signals representing the phase of the stator current, and a coupling path (530) for coupling the phase-corrected signals representing the phase of the stator current to the switching controller (218).

What is claimed is:

1. A method for controlling the speed of an induction motor including a rotor, said method comprising the steps of:
    selecting a desired rotor speed;
    determining motor rotor speed;
    comparing said motor rotor speed to said desired rotor speed, to thereby generate a speed error signal;
    applying said speed error signal to a proportional-integral controller, to thereby generate a torque command signal;

normalizing said torque command signal to maximum specified torque to thereby generate normalized signals;
determining a magnetizing current of said motor;
generating a stator current amplitude command signal from said torque command signal;
determining ideal volts/Hz value for the motor;
subtracting an actual volts/Hz value from the ideal volts/Hz value for the motor, to thereby generate volts/Hz error;
multiplying said volts/Hz error by at least a constant and an integral to thereby generate a phase correction signal;
generating a current phase precursor signal from said torque command signal;
adding said current phase precursor signal to said phase correction signal to thereby generate a signal representing the phase of the stator current; and
controlling the switching of current to and from a central capacitor in response to said amplitude command signal and said signal representing the phase of said stator current.

2. A method according to claim 1, wherein said step of determining motor rotor speed further comprises the step of measuring rotor speed with a tachometer.

3. A method according to claim 1, wherein said step of generating a stator current amplitude command signal from said torque command is performed by iteratively calculating $$I_{AC\text{-}Link} = \sqrt{\text{torque current}^2 + \text{magnetizing current}^2}.$$

4. A method according to claim 1, wherein said step of generating a current phase precursor signal from said torque command signal is performed by iteratively calculating $$\text{current phase precursor} = \arctan\left(\frac{\text{magnetizing current}}{\text{torque current}}\right).$$

5. A method according to claim 1, wherein said step of generating a stator current amplitude command signal from said torque command is performed by iteratively calculating $$I_{AC\text{-}Link} = \sqrt{\text{torque current}^2 + \text{magnetizing current}^2}$$

and said step of generating a current phase precursor signal from said torque command signal is performed by iteratively calculating $$\text{current phase precursor} = \arctan\left(\frac{\text{magnetizing current}}{\text{torque current}}\right).$$

6. A control apparatus for an induction motor, which induction motor includes a stator, said control apparatus comprising:

a source of three-phase alternating current;
a switching circuit including a source port coupled to said source of alternating current and a motor port coupled to said stator, said switching circuit including a central capacitor through which all charge flows between said source port and said motor port and also including controllable switches for routing said charge to create stator current;
a switching controller coupled to said controllable switches for establishing the timing of said controllable switches in response to digital command signals representing (a) the amplitude of the stator current and (b) the phase of the stator current;
a source of motor speed command signals;
a motor control arrangement coupled to said source of motor speed command signals and to said switching controller, said motor control arrangement comprising an error detector for generating a motor speed error signal, a torque command controller for generating a torque command signal from said speed error signal, a torque current normalizing arrangement for normalizing said torque command signal to the full-load motor torque to produce torque current signal, for processing said torque current signal for generating signals representing (a) the amplitude of the stator current and (b) the phase of the stator current, both adjusted by the magnetizing current of the motor; said motor control arrangement further comprising a coupling path for coupling said amplitude of the stator current adjusted by the magnetizing current from said motor control arrangement to said switching controller for control of the timing of said switches, an error detector coupled to said motor port and to a source of nominal motor V/Hz signal, for generating V/Hz error signal, a summing circuit coupled to sum processed V/Hz error signal with said signals representing the phase of the stator current, to thereby generate phase-corrected signals representing the phase of the stator current, and a coupling path for coupling said phase-corrected signals representing the phase of the stator current to said switching controller.

7. A method for controlling the speed of an induction motor, said method comprising the steps of:
determining a torque command signal;
generating an amplitude command signal from said torque command signal;
generating a stator current amplitude command signal from said torque command signal;
determining a phase correction signal;
generating a current phase precursor signal from said torque command signal;
adding said current phase precursor signal to said phase correction signal to thereby generate a signal representing the phase of a stator current; and
controlling the switching of current to and from a capacitor in response to said amplitude command signal and said signal representing the phase of said stator current.

* * * * *